Figure 1:
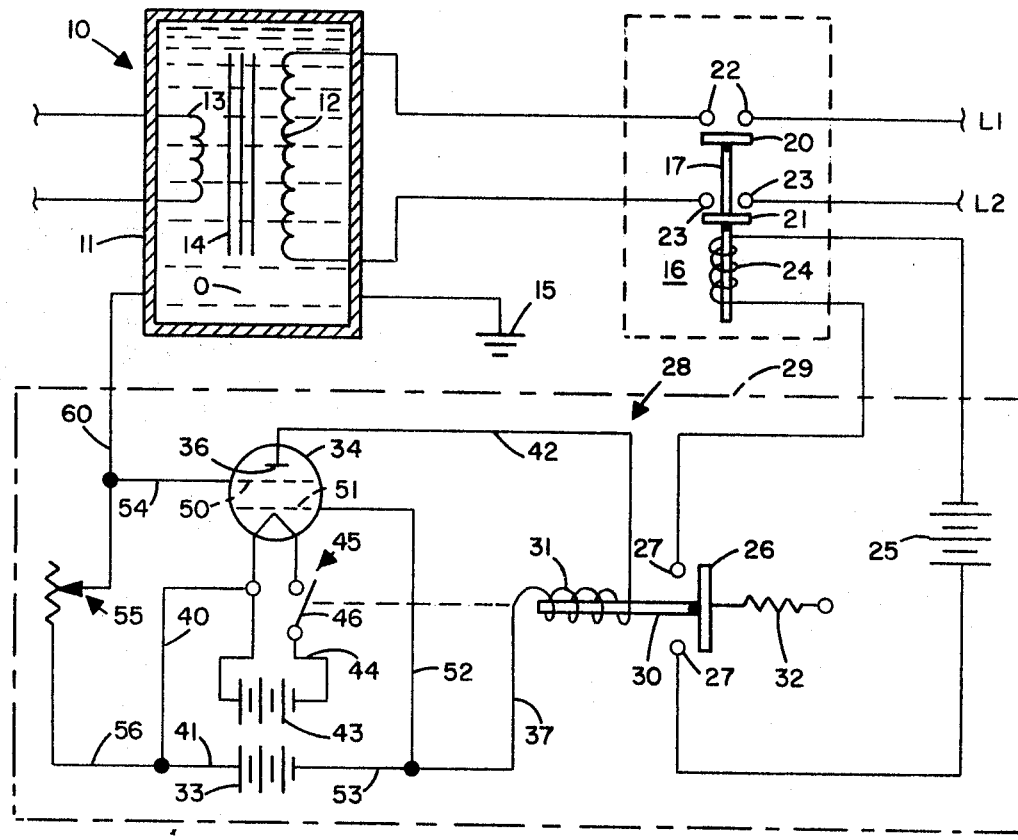

United States Patent

[11] 3,596,135

[72] Inventors Andrew Stenger, Jr., 6482 27th Ave. North;
James S. Hall, both of St. Petersburg, Fla.
[21] Appl. No 592,452
[22] Filed Nov. 7, 1966
[45] Patented July 27, 1971
[73] Assignee said Stenger, by said Hall
Continuation-in-part of application Ser. No.
290,124, June 24, 1963, now Patent No.
3,296,494.

[54] METHOD AND APPARATUS FOR DETECTION OF
BREAKDOWN OF INSULATION IN ELECTRICAL
EQUIPMENT
11 Claims, 2 Drawing Figs.
[52] U.S. Cl. .................................................. 317/14,
317/15, 317/18
[51] Int. Cl. .................................................. H02h 7/16,
H02h 7/26
[50] Field of Search .......................................... 317/10, 14,
15, 17, 18

[56] References Cited
UNITED STATES PATENTS
3,275,889  9/1966  Sharp et al ................... 317/14
3,253,188  5/1966  Nissel .......................... 317/10
3,286,130  11/1966 Clinton ........................ 317/15 X
3,296,494  1/1967  Stenger et al. ............... 317/17

Primary Examiner—James D. Trammell
Attorney—Roy E. Raney

ABSTRACT: An electromagnetic sensing device is adapted to respond to electromagnetic signals generated in electrical equipment such as transformers, and to amplify the signals for actuating an indicator or control mechanism, the signals change because of incipient breakdowns in insulation in the equipment thereby causing a change in the indicator or control mechanism which results in shutting down the equipment prior to a major breakdown of insulation.

PATENTED JUL 27 1971

3,596,135

INVENTORS
ANDREW STENGER JR.
JAMES S. HALL

BY

Roy E Ramey

ATTORNEY

METHOD AND APPARATUS FOR DETECTION OF BREAKDOWN OF INSULATION IN ELECTRICAL EQUIPMENT

The present application is a continuation-in-part of our application Ser. No. 290,124 filed June 24, 1963, now U.S. Pat. No. 3,296,494.

The present invention relates to the detection of the initial stages of a defect or breakdown of insulation in electrical equipment, such as power transformers, circuit breakers and the like, whereby the equipment can be removed from service and repaired before serious and damaging short circuiting occurs through a breakdown of the insulation.

Heretofore, attempts have been made to afford protection of electrical equipment, such as power transformers, circuit breakers and the like, by providing devices connected in the circuit of the equipment and which sense abnormal increases in current flow to open the circuits and protect the equipment and personnel. Generally, these devices operate only after damaging currents have passed through the equipment and merely serve to prevent further damage to persons and installations resulting from the short circuiting of the equipment.

The principal object of the present invention is the provision of a new and improved method and apparatus for detecting an initial minute or incipient breakdown of insulation in electrical equipment, particularly equipment powered by AC or pulsating current, so that the power circuit to the equipment can be disconnected prior to the development of damaging short circuitings in the equipment, thereby preventing costly damage and interrupted service and possible injury to life and limb.

A further object of the invention is the provision of a method of detecting eminence of a breakdown in the insulation in conductors in electric power equipment of the type mentioned which comprises providing an electromagnetic wave detecting and measuring instrument capable of detecting electromagnetic waves radiated by electric spark discharges and the like, placing the sensing element or antenna of the instrument so as to be receptive to electromagnetic waves generated in the equipment to be protected, determining the electromagnetic wave indication of the instrument for normal operation of the equipment and opening the power circuit of the equipment in response to the detection of a variation in character of the electromagnetic waves from normal. Normally the variation in character is a variation from the normal AC frequency, such as 60cycles per second, to an indeterminately high frequency resulting from sparking or the like.

In carrying out the invention, a radio wave detection instrument is provided which comprises an amplifier circuit having the input derived from an antenna arranged to pick up electromagnetic waves emanating from the AC powered equipment to be protected, such as the windings of a transformer, and which input biases a current flow control device, such as a grid-type vacuum tube, so as to provide a current output which varies in accordance with variations of the input. The output is connected with a current responsive indicator or control means, and the output resulting from the input of the normal AC current flow in the equipment to be protected is arranged to effect a normal reading or condition in the indicator or control means, and in the event the input signals change by reason of leakage of current from one part of the equipment to the other, the output of the amplifier changes which affects the indicator or control means so that the current supply to the equipment can be interrupted, either manually or automatically, in the case of the use of control means, and thereby remove the equipment from service prior to a major damaging short circuit therein.

Figure 2:
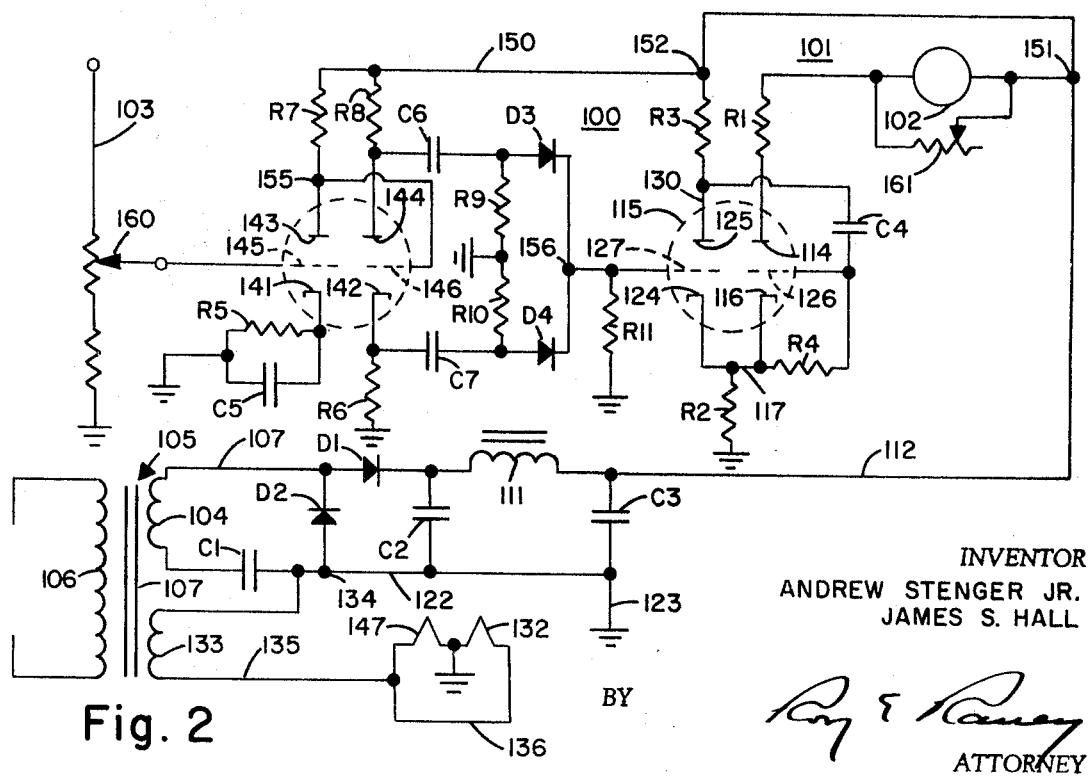

Other objects and advantages of the invention will be apparent from the following description of preferred forms of embodiments thereof, reference being made to the accompanying drawings wherein:

FIG. 1 is a wiring diagram showing a protective system for power transformers; and FIG. 2 is a wiring diagram of a second form of the invention.

Referring to FIG. 1, a conventional power transformer 10 is shown having the usual metal casing or housing 11, a primary coil 12, a secondary coil 13, and a core 14. The coils and core are immersed in insulating oil O and the casing is conveniently grounded at 15, as is conventional in the art. Power lines L1 and L2 are connected with opposite leads of the primary coil 12 through a double pole contactor or circuit breaker 16 having an armature 17 carrying contact bars 20, 21 which are adapted to bridge two sets of spaced contacts 22, 23, respectively, as long as a solenoid 24 of the circuit breaker is energized. The contactors 22, 23 could be closed manually and then retained in the closed position by energization of the solenoid 24, if desired.

Solenoid 24 is controlled by a detector and amplifier unit 28 which is enclosed in a suitable housing 29, and comprises a suitable battery 25 and a relay contactor bar 26 arranged to close on and bridge two spaced contacts 27 connected in the circuit for solenoid 24, as shown. Contactor 26 is carried on an armature 30 arranged to be actuated by a solenoid 31, when the solenoid is energized, to maintain the contactor closed on contacts 27. When the solenoid 31 is deenergized the contactor 26 is moved from the contacts 27 by a return spring 32 to break the circuit of solenoid 24, resulting in opening of the power circuit to the transformer winding 12. Preferably, suitable means are provided whereby contactor 26 must be initially manually closed, after which it is retained in its closed position by the solenoid 31 as long as this solenoid is energized, as described hereinafter.

The circuit for solenoid 31 is energized by a battery 33 through a circuit including a vacuum tube 34 having a cathode 35 and a plate 36. One lead of solenoid 31 is connected by wire 37 to the positive terminal of the battery 33 and cathode 35 is connected to the negative terminal of the battery by wires 40, 41. Plate 36 is connected to the other lead of solenoid 31 by wire 42. In the embodiment shown, battery 33 is a 67½ v. "B" battery and tube 34 is a type 1-T-4.The cathode heater circuit of the tube 34 includes a 1½ v. battery 43 with the negative terminal connected by a wire 44 to one terminal of a switch 45, and the movable contact 46 of the switch is actuated by the armature 30 to close the switch 45 when the contactor 26 is closed on contacts 27. Switch 45 includes a handle, not shown, which projects from housing 29 for convenient access and which may be operated to open and close the switch and the contactor 26 simultaneously for making and breaking the circuits of solenoid 24 and cathode 35.

The flow of current through tube 34 is controlled by grids 50, 51, grid 50 being connected to the cathode 35 and grid 51 being connected to the positive terminal of battery 33 by wires 52, 37. Grid 50 is connected to the negative terminal of battery 33 by a circuit comprising wire 54, variable resistor 55, and wires 56, 41. A sensor or collector element 60, which may be a section of suitable wire, is connected with wire 54 and is soldered or otherwise electrically connected to the metal housing 11 of the transformer so that it receives electromagnetic signals generated by the passage of AC current through the transformer windings 12, 13 as well as electromagnetic waves generated by the passage of current from a winding to another part of the transformer, for example.

It will be understood that when switch 45 is closed and current is flowing through the heater circuit for the cathode 35, current may flow from the cathode to the plate 36, the solenoid 31 and to the battery 33 and contactor 26 will be closed. While the collector 60 is subjected to electromagnetic waves, a negative bias is impressed on grid 50 tending to block the passage of current through the tube. The density of the electromagnetic waves necessary to bias the grid 35 may be adjusted by variable resistor 55 which includes an adjusting knob, not shown, projecting from the housing 29. By increasing the resistance of resistor 55 the sensitivity of the circuit to a electromagnetic waves can be increased. The resistor 55 is adjusted so that when the collector 60 is subjected to the electromagnetic waves necessary to bias the grid 35 may be adjusted by variable resistor 55 which includes an adjusting knob, not shown, projecting from the housing 29. By increasing the resistance of resistor 55 the sensitivity of the circuit to a electromagnetic waves can be increased. The resistor 55 is adjusted so that when the collector 60 is subjected to the electromagnetic forces emanating from the passage of normal AC current through the winding of the transformer, the bias on the grid 50 permits a flow of current through the tube 34 sufficient to maintain the armature 30 drawn by solenoid 31 to its contact closed position and thereby maintain the contacts of relay 16 closed.

When collector 60 is subjected to electromagnetic waves resulting from leakage of current from one part of the transformer 10 to another part, the frequency of the resulting electromagnetic waves are infinitely in excess of the normal 60 cycles and therefore the grid 35 is biased to block the flow of current through the tube 35 sufficiently to cause the solenoid 31 to release armature 30, thereby opening contacts 27 which results in breaking the circuit for relay solenoid 24 which opens the circuit of the winding 12 at contacts 22, 23. Thus, leakage of minute currents through the insulation of the transformer are readily detected by reason of the increase in frequency of the electromagnetic waves before damaging short circuiting develops.

Another form of the invention is shown in FIG. 2 which discloses an indicator means powered by the usual 120 v. commercial electrical source and which may be used to detect incipient breakdowns in the winding insulation of electrical equipment powered by AC or pulsating current. For sake of brevity, such equipment is not shown, but could be like the transformer 10, as an example.

In general, the form of the invention shown in FIG. 2 comprises an electromagnetic wave detecting circuit 100 and an amplifier circuit 10k, the output of the amplifier being arranged to energize an indicator 102 in the form of a milliamp meter. The detector circuit 100 includes a collector element 103 arranged to pick up electromagnetic waves emanating from the equipment to be protected; for example, the collector could be electrically connected to a grounded metal housing for the transformer which is to be protected. When normal AC or pulsating current is supplied to the equipment in question, and the insulation in the equipment is functioning normally, the electromagnetic waves produced by the variations in the flow of current in the equipment will be reflected by the milliamp meter 102 which is adjusted to provide a normal reading. This reading may be arbitually selected. Preferably, the milliamp meter 102 is a recording type so that deviations from the normal reading can be readily observed. When an incipient breakdown in the insulation in the equipment to be protected occurs, the frequency of the electromagnetic waves arising from the resulting flow of short-circuited electrons is infinitely greater than the normal frequency, such as 60 c.p.s., and this increased frequency causes a deflection of the meter 102 from normal, thereby indicating need for servicing of the equipment before a major and damaging short circuit occurs. The equipment may then be taken from service and repaired before a damaging short circuit occurs.

The circuit for energizing the meter 102 includes the secondary 104 of a 120 v. transformer 105 having a primary winding 106 and a core 107. The primary winding may be connected to any convenient power supply and one lead of the secondary winding 104 is connected with one terminal of the meter 102 through a conductor 107, a diode D1, choke coil 111, and conductors 112, 113. The other terminal of the meter 102 is connected with a plate 114 of a vacuum tube 115 of the amplifier circuit through a resistor R1. The tube 115 includes a cathode 116 connected through a conductor 117 and a resistor R2, to ground. The other lead of the transformer winding 104 is connected to ground through a condenser C1 and conductors 122, 123. A diode D2 is connected between conductors 122 and 107 so as to cooperate with diode D1 to provide pulsating unidirectional current to the conductor 112.

Preferably, condensers C2, C3 are connected in parallel across the conductors 112 and 122 on opposite sides of the choke coil 111 to smooth the DC current supply from the transformer 105.

The tube 115, in the form of the invention shown, is known as a 12 AX7 and it includes a cathode 124 and a plate 125. Grids 126, 127 are interposed between the cathode 116 and plate 114 and the cathode 124 and plate 125, respectively. The cathode 124 is connected to ground through resistor R2, and the plate 125 is connected by a conductor 130, including resistor R3, with the detector circuit 100, as described hereinafter, and is also connected with the grid 126 through a condenser C4. The grid 126 is connected to ground through a resistor R4, conductor 117 and resistor R2.

The cathodes 116, 124 are heated by electric filament means 132 which is energized by a circuit including a secondary winding 133 of the transformer 105, one lead of which winding is connected to the conductor 122 at junction 134, and the other lead of the winding being connected with one side of the filament means 132 by conductors 135, 136. The other side of the filament means 132 is connected to ground, as shown.

The detector circuit 100 comprises a vacuum tube 140, which may be a type known as a 12AX7. The tube 140, includes two cathodes 141, 142 and plates 143, 144 which are opposite the respective cathodes. Control grids 145, 146 are interposed between the respective sets of cathodes and plates. The cathodes 141, 142 are heated by filament means 147 which is connected in parallel circuit with the filament means 132 so that both filament means are energized by the same power supply.

The cathode 141 is connected to a conductor 150 through resistors R7, R8, respectively, and the conductor 150 is connected with conductor 112 at 151 and with resistor R3 at 152. The grid 145 is connected to the collector 103 at junction 154, and the grid 146 is connected in the circuit of plate 143 at 155.

The grid 127 of the amplifier tube 115 is connected with the output of the detector tube 140 by a circuit which includes junction 156 which is connected in the circuit of plate 144 through a condenser C6 and a diode D3, and is connected with the circuit of the cathode 142 through a condenser C7 and a diode D4. Resistors R9, R10 are connected between condenser C6 and diode D3 and condenser C7 and diode D4, respectively, and ground. Grid 127 is connected to ground through resistor R11.

The detector circuit 100 may be adjusted for sensitivity by a variable resistor 160, and the reading of the meter 102 can be adjusted by a rheostat 161 connected in parallel therewith.

The values of various components in the circuit shown in FIG. 2 are as follows;

| Resistors | Capacitors | Diodes |
| --- | --- | --- |
| R1—47K | C1—30 mf. | D1—100 ma. |
| R2—4.7K | C2—20 mf. | D2—100 ma. |
| R3—47K | C3—20 mf. | D3—1N54 |
| R4—3.9K | C4—0.05 mfd. | D4—1N54 |
| R5—1K | C5—25 mfd. | |
| R6—22K | C6—0.01 mfd. | |
| R7—68K | C7—0.01 mfd. | |
| R8—22K | | |
| R9—100K | | |
| R10—100K | | |
| R11—220K | | |

As mentioned previously, the collector 103 could be connected to the grounded metal housing of the equipment to be protected, as shown with respect to the collector 60. Alternatively, the collector could be connected with a length of conductor inserted inside the transformer to be protected so as to be subjected to the magnetic field within the transformer.

Assuming that the apparatus of FIG. 2 is to be used to protect a transformer like the transformer 10, the meter 102 is adjusted by the variable resistor 160 so that the output of the amplifier tube 115 drives the indicator element to an intermediate position as the detector circuit 100 responds to the normal 60cycle electromagnetic waves set up by the alternating current flowing in the transformer winding, and the output of the detector circuit controls the amplifier tube accordingly. The meter 102 will record this reading as long as the operation of the transformer is normal, insofar as the character of the insulation is concerned. In the event the insulation means of the transformer becomes the least defective so as to result in short circuiting, the initial minute tickle of current will be manifested by discharge of electrons and this discharge will create an electromagnetic wave having an indeterminately high frequency. This change in the character of the electromagnetic wave phenomenon is detected by the detector circuit 100 and results in the amplifier tube 115 being operated to reduce the plate current flow therethrough. The reduction in output of the amplifier tube 115 is reflected by the meter 102, causing the indicator element to be deflected from normal. Thus, it is evident that an incipient breakdown in the insulation of the equipment is occurring and steps may then be taken to remove the equipment from service before severe damage occurs by reason of a major breakdown of the insulation.

As indicated, alternatively the meter 102 could be replaced by a control mechanism for automatically shutting down the power supply to the equipment in response to a change from the normal output of the amplifier circuit.

Although but two forms of the invention have been shown, it will be apparent that other forms, modifications and adaptations thereof may be made, all falling within the scope of the claims which follow.

We claim:

1. A transformer or the like including a metal casing, a protective system for said transformer comprising a switch to control the power to said transformer, and a device adapted to respond to electromagnetic signals for sensing electromagnetic signals produced in said casing as a result of electric current passing through said transformer, said device including electric current amplifying means for operating said switch in response to a change in character of said electromagnetic signals in said casing.

2. A protective system of the type set forth in claim 1 in which said electric current amplifying means includes a grid tube, and a circuit through said tube, the grid of said tube being responsive to said electromagnetic signals.

3. A transformer as defined in claim 1 further characterized by said electrical current amplifying means comprising an electric power circuit connected with said switch means, a current control device in said power circuit including a biasing element controlling the flow of current through said control device, said biasing element being responsive to change in a character of electromagnetic signals in said casing.

4. A transformer as defined in claim 3 characterized by the casing being grounded.

5. A system for indicating incipient short circuiting conditions in electric power equipment of the type having insulated windings, said system comprising an electric current responsive device having means movable in response to changes in current flow therein, and means responsive to electromagnetic waves produced in said equipment when said equipment is energized to vary the current flow in said device in response to changes in said electromagnetic waves.

6. A system as defined in claim 5 characterized by the last-mentioned means including a detector circuit having a current flow control element responsive to electromagnetic waves produced in said equipment, and the output of the detector controlling said device.

7. A system as defined in claim 6 characterized by the sensitivity of said device to the output of said detector being adjustable.

8. A system as defined in claim 6 in which the detector circuit includes a grid controlled vacuum tube, the grid of said tube being controlled by an element subjected to electromagnetic waves in said equipment.

9. A system as defined in claim 5 characterized by said device comprising an indicator, and means to adjust the indicator for a reading of electromagnetic waves occuring in said equipment during normal operation thereof.

10. A system as defined in claim 5 characterized by said device comprising a relay adapted to be operative to one position in response to a given electromagnetic wave characteristic in said equipment and operative to a second position in response to a different electromagnetic wave characteristic in said equipment.

11. A system as defined in claim 5 in which the last-mentioned means includes a detector circuit and an amplifier circuit, said detector circuits being subjected to electromagntic wave in said equipment, and said amplifier being responsive to the output of said detector circuit.